G. E. WILKINS & J. C. B. RICHARDS.
LIFTING JACK.
APPLICATION FILED MAR. 9, 1912.
1,060,963.
Patented May 6, 1913.
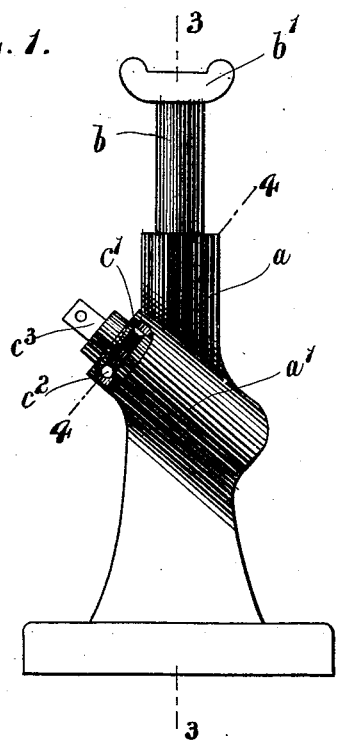
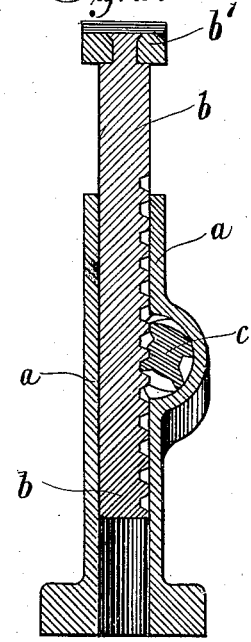
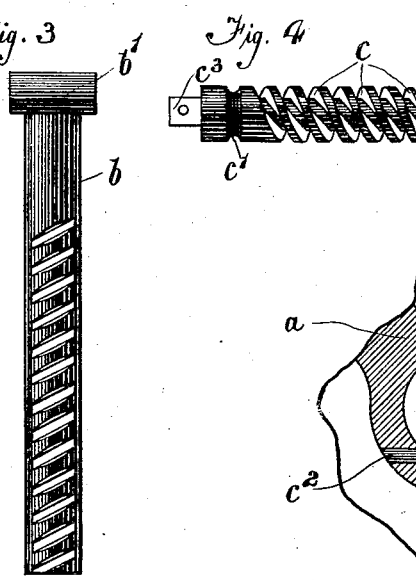
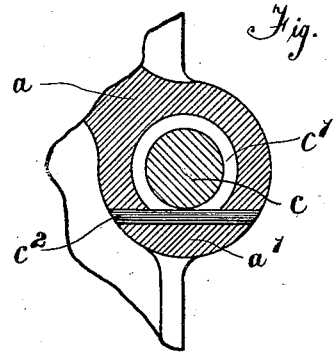
Witnesses
Inventors
G. E. Wilkins and J. C. B. Richards
By their Attorney

UNITED STATES PATENT OFFICE.

GEORGE EMANUEL WILKINS AND JOHN CHARLES BURTON RICHARDS, OF WEDNESBURY, ENGLAND.

LIFTING-JACK.

1,060,963. Specification of Letters Patent. Patented May 6, 1913.

Application filed March 9, 1912. Serial No. 682,625.

*To all whom it may concern:*

Be it known that we, GEORGE EMANUEL WILKINS and JOHN CHARLES BURTON RICHARDS, subjects of the King of Great Britain, residing at Moxley, Wednesbury, and Glenhurst, Franchise street, Kings Hill, Wednesbury, respectively, in the county of Stafford, England, have invented a new and useful Lifting-Jack; and we do hereby declare the following to be a full, clear, and exact description of the same.

Our invention comprises improvements in lifting jacks more especially intended for lifting motor cars and other vehicles, and refers to that class of such which embody a standard or base portion and a movable head carried by a rack or toothed member slidably supported within the standard, the object of our said invention being to provide an improved jack which is exceedingly quick in action and which may be operated with a minimum effort.

According to our invention the rack is controlled by means of a screw or worm carried by the standard, the said worm engaging teeth upon the rack and whereby the rack and crutch may be raised or lowered as desired.

Referring to the drawings:—Figure 1. is an elevation of a lifting jack according to our invention. Fig. 2. is a vertical section at 3—3 at Fig. 1. Fig. 3. illustrates the rack and crutch removed. Fig. 4. shows the controlling screw, and Fig. 5. is an enlarged cross section at 4—4 in Fig. 1.

In carrying our invention into practice as illustrated upon the accompanying drawings, our lifting jack is made in three parts, viz:—a standard $a$, a rack $b$, and a controlling screw $c$. The standard is preferably cast having a vertical hole to receive the rack and an inclined bearing $a^1$ to receive the controlling screw, this bearing being open at its upper end, and closed at its lower end, and so disposed in relation to the vertical hole that when the rack is in the vertical hole and the screw in the inclined bearing hole the said screw will engage the rack. The rack is provided with a suitable head $b^1$. The screw is preferably of two start form and being disposed at an angle of about 30 degrees it will then engage teeth on the rack if cut at a similar angle. The controlling screw is provided with an annular groove or recess $c^1$ which is engaged by a transverse securing pin $c^2$ passed through the standard whereby the screw is retained in position in said standard. As stated when the screw is rotated the rack is raised or lowered, the weight being carried by the screw the periphery of which has a long bearing in the inclined hole, the weight being partly supported on the periphery of the screw and partly by the lower end of the screw at which point the resultant force acts.

As will be seen the only friction in the jack is between the teeth of the rack and the screw, between the periphery of the screw and its bearing, and at the lower end of the screw. As the teeth of the rack are inclined at a considerable angle it will be seen that the friction between the rack and the screw is small, while as only the apex of the screw thread is in contact with the inclined hole there is only a small amount of friction between these two parts. The amount of friction between the extremity of the screw and the end of the bearing depends upon the area in contact and by suitably designing this the jack may be made so that it will just retain under load, while it may be operated with a minimum effort, the screw being provided with a square or equivalent head $c^3$ whereby it may be rotated by the usual T shaped spanner or key not shown.

Claims:

1. In a lifting jack, the combination of a standard; a movable rack disposed longitudinally within the standard, there being inclined teeth cut upon said movable rack; an inclined bearing part on said standard disposed tangentially in relation to the movable rack; and a worm located in said inclined bearing having its screw thread formed upon its periphery and engaging the said rack; all for the purpose specified and substantially as set forth.

2. In a lifting jack, the combination of a standard; a movable rack disposed longitudinally within the standard; inclined teeth cut upon said movable rack, there being an inclined bearing part on said standard disposed tangentially in relation to the movable rack; a worm located in said inclined bearing having its screw thread formed upon its periphery and engaging the said rack;

and means for restraining the worm against bodily movement relative to the rack when said worm is rotated, so arranged that when the worm is rotated the rack is moved; all for the purpose specified and substantially as set forth.

In testimony whereof, we have signed our names to this specification in the presence of two subscribing witnesses.

GEORGE EMANUEL WILKINS.
JOHN CHARLES BURTON RICHARDS.

Witnesses:
HAROLD J. C. FORRESTER,
NORMAN S. BARLOW.

Copies of this patent may be obtained for five cents each, by addressing the "Commissioner of Patents, Washington, D. C."